United States Patent
Ur et al.

(10) Patent No.: US 10,063,453 B1
(45) Date of Patent: *Aug. 28, 2018

(54) SYSTEM, METHOD, AND COMPUTER PROGRAM FOR TAG BASED TESTING OF VIRTUAL SERVICES

(71) Applicant: Amdocs Software Systems Limited, Dublin (IE)

(72) Inventors: Shmuel Ur, Shorashim (IL); Itzik Kitroser, Beer Sheva (IL); Ofer Hermoni, Yavne (IL); Eyal Felstaine, Hertzeliya (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 377 days.

This patent is subject to a terminal disclaimer.

(21) Appl. No.: 14/593,538

(22) Filed: Jan. 9, 2015

Related U.S. Application Data

(60) Provisional application No. 62/034,721, filed on Aug. 7, 2014.

(51) Int. Cl.
G06F 15/173 (2006.01)
H04L 12/26 (2006.01)

(52) U.S. Cl.
CPC .................................. *H04L 43/50* (2013.01)

(58) Field of Classification Search
None
See application file for complete search history.

(56) References Cited

U.S. PATENT DOCUMENTS

| 8,264,385 B1* | 9/2012 | Dewan ................ G06F 11/3692 341/50 |
| 8,839,222 B1* | 9/2014 | Brandwine ......... G06F 11/3668 717/168 |
| 9,280,373 B1 | 3/2016 | Faught et al. |
| 2002/0017828 A1 | 2/2002 | Roesler |
| 2003/0182594 A1 | 9/2003 | Watkins et al. |
| 2005/0058324 A1* | 3/2005 | Karthik .............. G06K 9/00885 382/115 |

(Continued)

OTHER PUBLICATIONS

U.S. Appl. No. 62/034,715, filed Aug. 7, 2014.

(Continued)

*Primary Examiner* — Aaron Strange
*Assistant Examiner* — Mohammad Yousuf A Mian
(74) *Attorney, Agent, or Firm* — Zilka-Kotab, PC

(57) ABSTRACT

A system, method, and computer program product are provided for tag based testing of virtual services. In use, an original portion of a system within a network in which to implement at least one modification is identified, the original portion of the system including a first virtual service and a second virtual service. Additionally, the original portion of the system is duplicated implemented within the network to form an updated portion of the system. Both the original portion and the updated portion share a single instance of a third service. The updated portion is then tested by processing the same data through the original portion, including the single instance of the third service, and through the updated portion, including the single instance of the third service, and comparing the outputs thereof.

12 Claims, 8 Drawing Sheets

(56) References Cited

U.S. PATENT DOCUMENTS

| | | | |
|---|---|---|---|
| 2005/0234683 A1 | 10/2005 | Graves et al. | |
| 2006/0059253 A1* | 3/2006 | Goodman | G06Q 10/10 |
| | | | 709/223 |
| 2008/0086660 A1 | 4/2008 | Wefers | |
| 2009/0143020 A1* | 6/2009 | Kotabe | H04L 12/2697 |
| | | | 455/67.11 |
| 2011/0050452 A1* | 3/2011 | Kusuma | G01V 11/002 |
| | | | 340/853.7 |
| 2011/0305149 A1 | 12/2011 | Scott et al. | |
| 2012/0084407 A1 | 4/2012 | Soulios et al. | |
| 2014/0068336 A1 | 3/2014 | Naveh | |
| 2014/0079074 A1 | 3/2014 | Tune et al. | |
| 2014/0165060 A1 | 6/2014 | Muller et al. | |
| 2014/0310401 A1 | 10/2014 | Thomas | |
| 2015/0172226 A1 | 6/2015 | Borshteen et al. | |
| 2015/0281054 A1 | 10/2015 | Utgikar et al. | |
| 2015/0332357 A1 | 11/2015 | McBride et al. | |
| 2015/0350060 A1* | 12/2015 | Patil | H04L 47/122 |
| | | | 370/238 |
| 2015/0381465 A1* | 12/2015 | Narayanan | H04L 43/062 |
| | | | 709/224 |
| 2016/0026558 A1* | 1/2016 | Krishnan | G06Q 10/00 |
| | | | 717/124 |

OTHER PUBLICATIONS

Ur, S. et al., U.S. Appl. No. 14/593,505, filed Jan. 9, 2015.
Non-Final Office Action from U.S. Appl. No. 14/593,505, dated Oct. 7, 2016.
Final Office Action from U.S. Appl. No. 14/593,505, dated May 25, 2017.
Advisory Action from U.S. Appl. No. 14/593,505, dated Aug. 21, 2017.
Notice of Allowance from U.S. Appl. No. 14/593,505 dated Mar. 26, 2018.

* cited by examiner

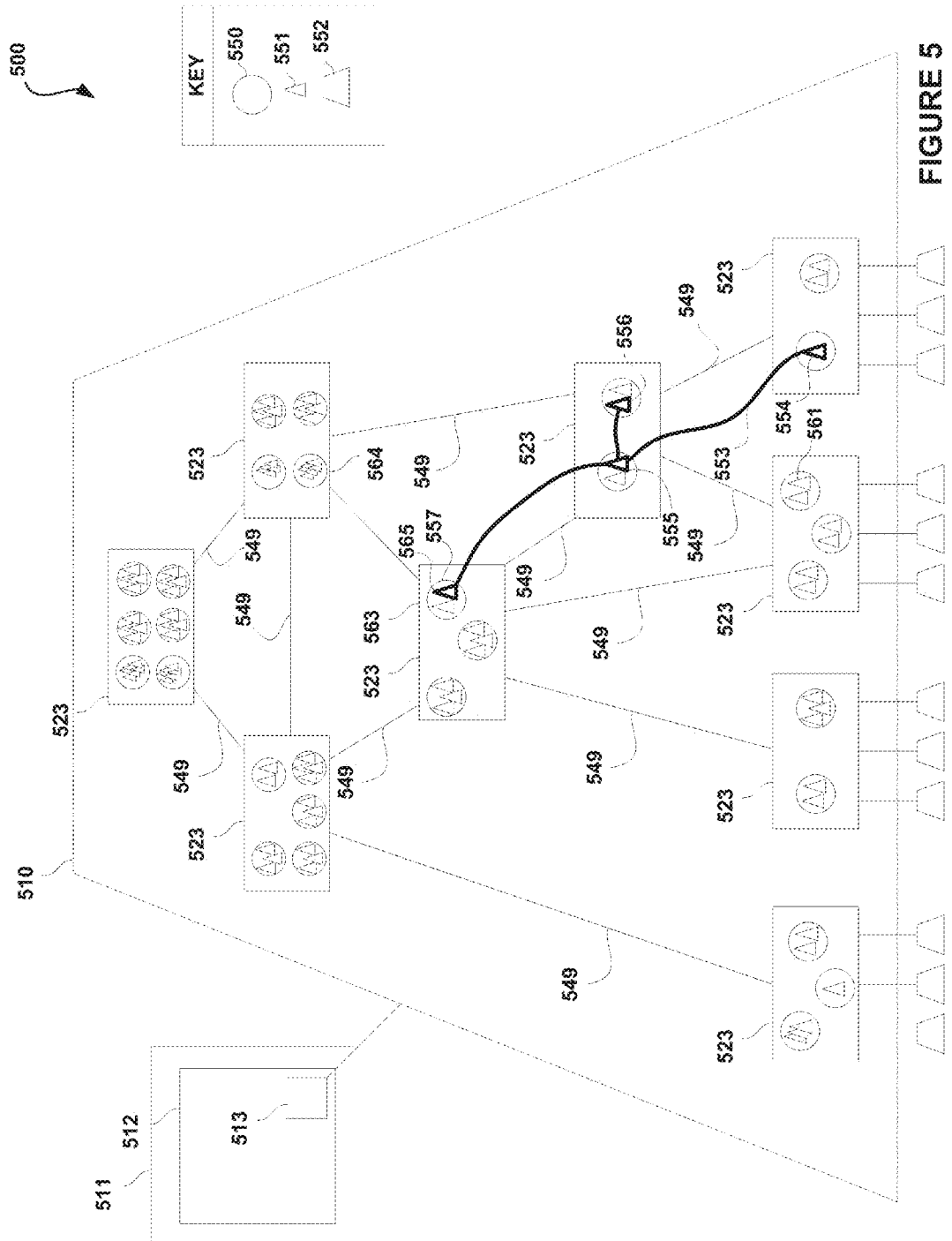

SYSTEM, METHOD, AND COMPUTER PROGRAM FOR TAG BASED TESTING OF VIRTUAL SERVICES

CLAIM OF PRIORITY AND RELATED APPLICATIONS

This application claims the benefit of U.S. Provisional Application No. 62/034,721, filed Aug. 7, 2014, the entire contents of which are incorporated herein by reference.

FIELD OF THE INVENTION

The present invention relates to virtual services, and more particularly to testing new and/or updated virtual services in a system.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently. The flexibility of the NFV-based network enhances the means available for optimizing the network's capacity and performance.

One of the perceived risks of the use of virtual services is quality. In some cases, a lack of trust in such services may be expected. A user of such services would like to be able to validate that the virtual system works, in an environment of that user.

Another potential issue is scaling of systems including virtual services. A user should know that, when a system or part of a system is scaled the system continues to work correctly.

Testing costs are very high. It is desirable to be able to reduce testing costs but also to enable testing at a production site while an existing system is running. The goal is to be able to show the customer, in the data, that the new/updated virtual services performs according to required criteria and do not cause new problems.

There is thus a need for addressing these and/or other issues associated with the prior art.

SUMMARY

A system, method, and computer program product are provided for tag based testing of virtual services. In use, at least a portion of a system to implement at least one modification is identified, the system including a plurality of services and the modification including one or more of an addition of at least one new virtual service or an update of at least one existing virtual service. Further, the at least one modification is implemented to the at least a portion of the system to generate an updated portion of the system and an original portion of the system, the updated portion of the system including the one or more of the addition of the at least one new virtual service or the update of at least one existing virtual service and at least one common service that is common with the original portion of the system. Additionally, the updated portion of the system is tested by: receiving input data associated with the updated portion of the system; duplicating the input data to generate a first input data and a second input data; tagging the first input data as testing data; tagging the second input data as regular data; processing the first input data with the updated portion of the system and processing the second input data with the original portion of the system, the processing of the first input data and the processing of the second input data including processing the first input data and the second input data utilizing the at least one common service; and comparing at least a portion of an output from the updated portion of the system with at least a portion of an output from the original portion of the system.

BRIEF DESCRIPTION OF THE DRAWINGS

FIG. 5 illustrates a simplified diagram of a deployed NFV-based network, in accordance with one embodiment.

DETAILED DESCRIPTION

Figure 1:
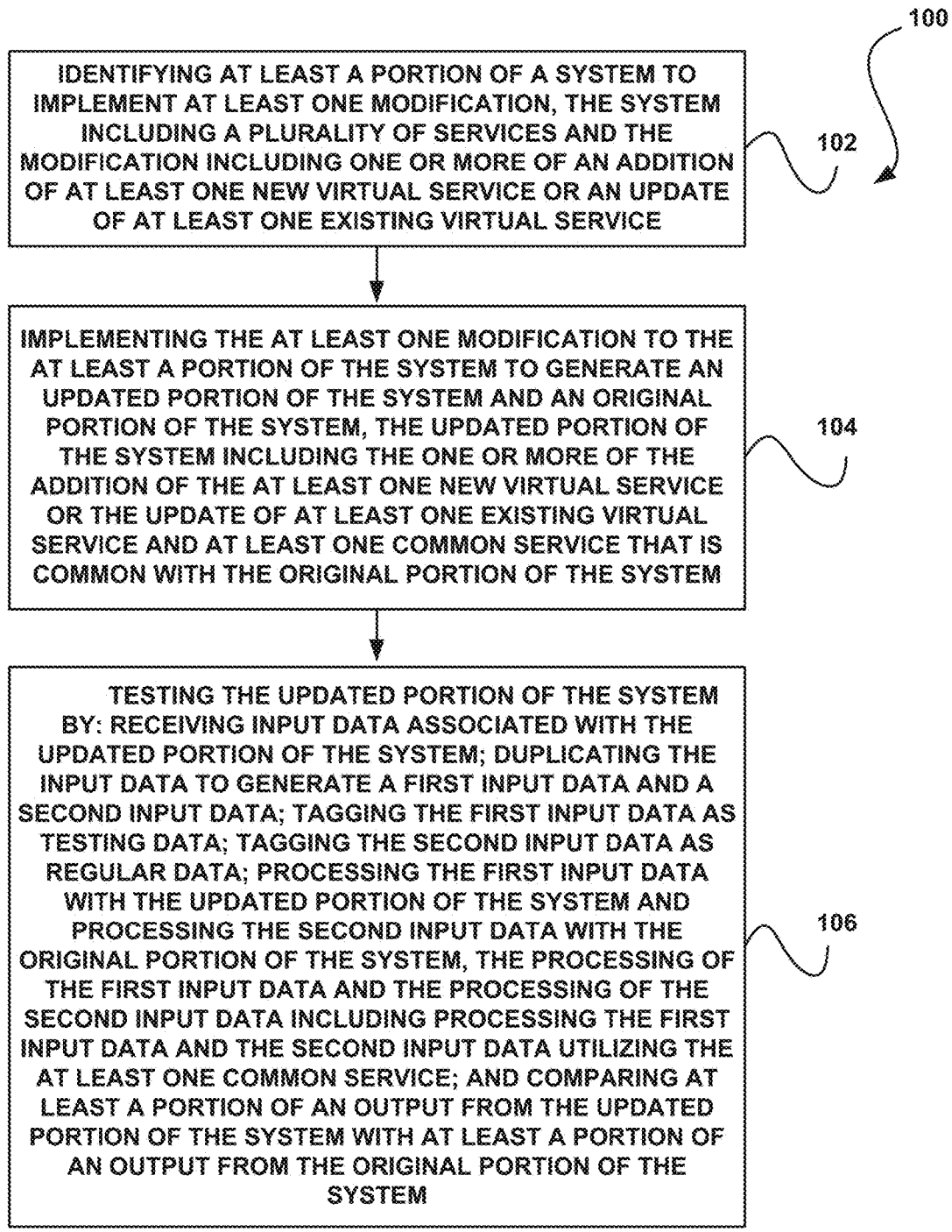
FIG. 1 illustrates a method for tag based testing of virtual services, in accordance with one embodiment.

FIG. 1 illustrates a method 100 for tag based testing of virtual services, in accordance with one embodiment.

As shown, at least a portion of a system to implement at least one modification is identified, the system including a plurality of services and the modification including one or more of an addition of at least one new virtual service or an update of at least one existing virtual service. See operation 102.

The virtual service may be associated with any type of system and/or function. For example, the virtual service may be associated with one or more virtual network functions that are part of a Network Function Virtualization based (NFV-based) system.

The system may include any NFV-based system or a hybrid physical and NFV-based system. A hybrid physical and NFV-based system may include a system with one or more physical elements and one or more virtual network functions.

As shown further in FIG. 1, the at least one modification is implemented to the at least a portion of the system to generate an updated portion of the system and an original portion of the system, the updated portion of the system including the one or more of the addition of the at least one new virtual service or the update of at least one existing virtual service and at least one common service that is common with the original portion of the system. See operation 104.

Additionally, the updated portion of the system is tested by: receiving input data associated with the updated portion of the system; duplicating the input data to generate a first input data and a second input data; tagging the first input data as testing data; tagging the second input data as regular data; processing the first input data with the updated portion of the system and processing the second input data with the original portion of the system, the processing of the first input data and the processing of the second input data including processing the first input data and the second input data utilizing the at least one common service; and comparing at least a portion of an output from the updated portion of the system with at least a portion of an output from the original portion of the system. See operation 106.

The data may be tagged with any information capable of being used to indicate whether the data is test data or regular data. For example, the first input data may be tagged with two bits indicating the first input data is testing data and the second input data may be tagged with two bits indicating the second input data is regular data. As another example, the first input data may be tagged with one bit indicating the first input data is testing data and the second input data may be tagged with one bit indicating the second input data is regular data. Further, in one embodiment, the first input data may be tagged with a plurality of bits indicating the first input data is testing data and indicating/identifying a test with which the first input data is associated.

In one embodiment, the first input data may be channeled to the updated portion of the system after the processing of the first input data utilizing the common service and the second input data may be channeled to the original portion of the system after the processing of the second input data utilizing the at least one common service. In this case, the channeling may be performed based on the tagging. In one embodiment, the channeling may be performed utilizing a forking element that includes at least one virtual network function.

In one embodiment, the comparing may be performed utilizing one or more comparators. As an option, the one or more comparators may include one or more semantic comparators.

A semantic comparator refers to a comparator that compares two input streams with regard to their semantic. This is a dedicated comparator. For example, two firewalls may have a classification of warnings and the comparator checks if the warnings belong to the same class.

As another option, the one or more comparators may include one or more database comparators. A database comparator refers to a comparator that works off line by comparing multiple streams. This may be useful for variety of reasons. One reason is that some testing may cause the tested stream to be in different orders. When comparing two streams, off line, results may be compared after reordering. Another reason is that the comparison may be performed at cheaper times, thus saving money. Another reason is that it can be used to compare expected results (collected in another run, or test, etc.) to the current run.

Further, in various embodiments, comparing the output from the updated portion of the system with the output from the original portion of the system may include an exact or partial comparison. An exact comparison refers to checking that all parts of the output are the same. A partial comparison refers to verifying that partial fields of the data are the same (e.g. ignore packet ID, etc.).

In one embodiment, a testing dispatcher may be utilized to copy the incoming input data. In this case, the testing dispatcher may include a new type of virtual network function with functionality to copy the incoming stream to the tested service. In addition, in various embodiments, the testing dispatcher may have auxiliary features such as delays, fuzz testing, and be able to cause out-of-order data.

Further, in one embodiment, the testing comparator may include a new type of virtual network function. The testing comparators may include simple and/or advanced comparators. For example, simple comparators may be available for every connection of the system. On the other hand, as an example, smart comparators may be available only for some locations.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
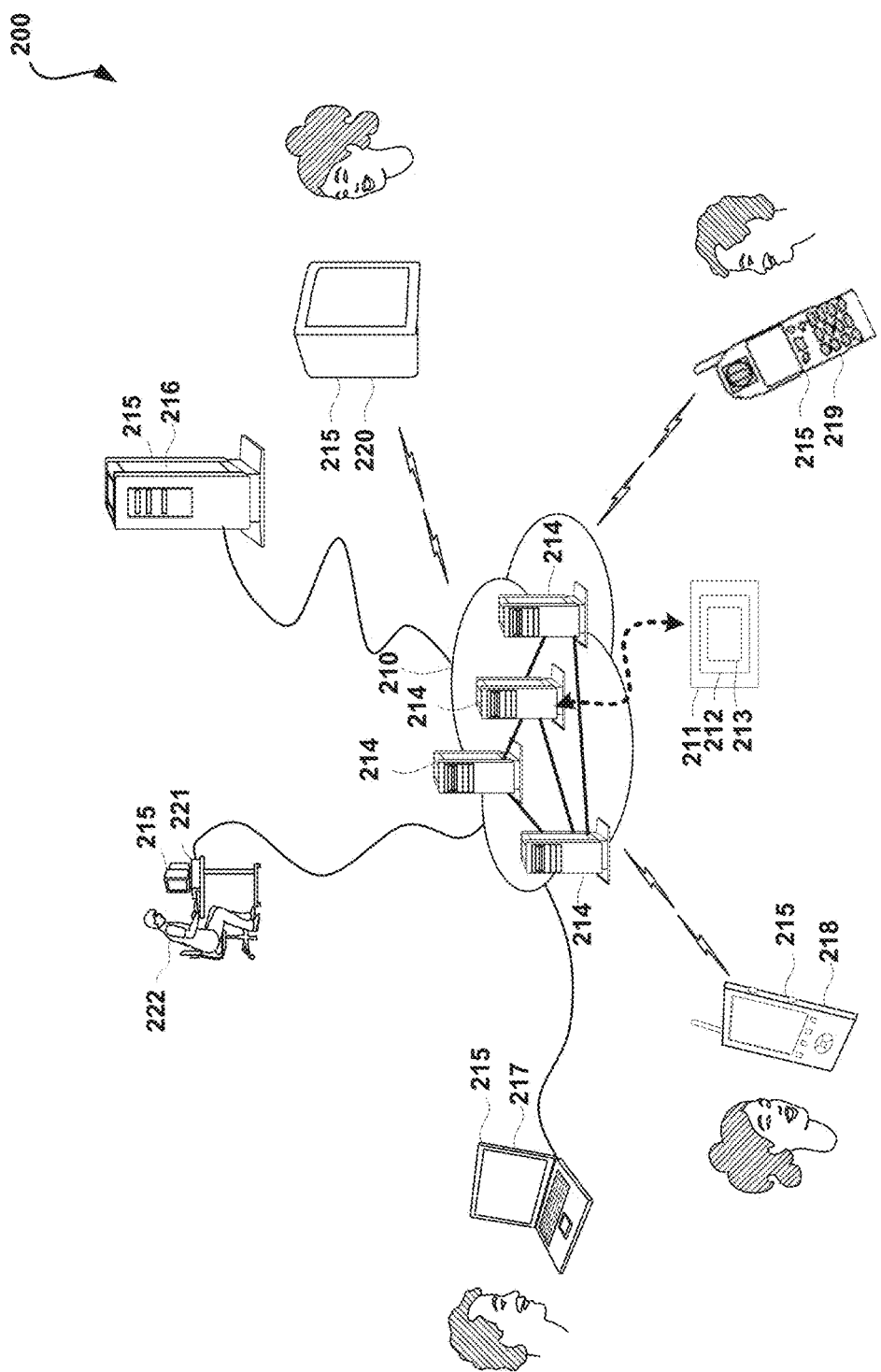
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 211, an NFV-orchestration (NFV-O) module 212, and a testing module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212 and the testing module 213.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The testing module 213 may be a part or a component of the NFV-O module 212. However, the testing module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the testing module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.) 2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the testing module 213.

Figure 3:
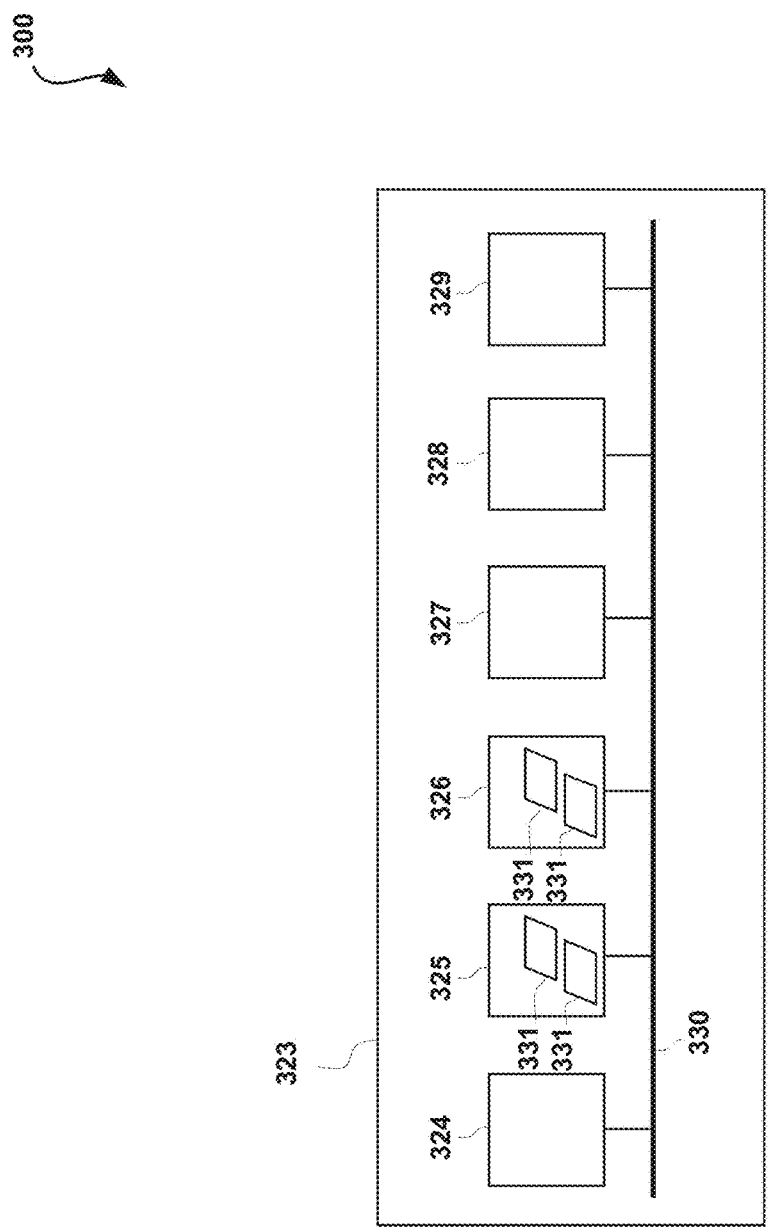
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the testing module 213 of FIG. 2.

Figure 4:
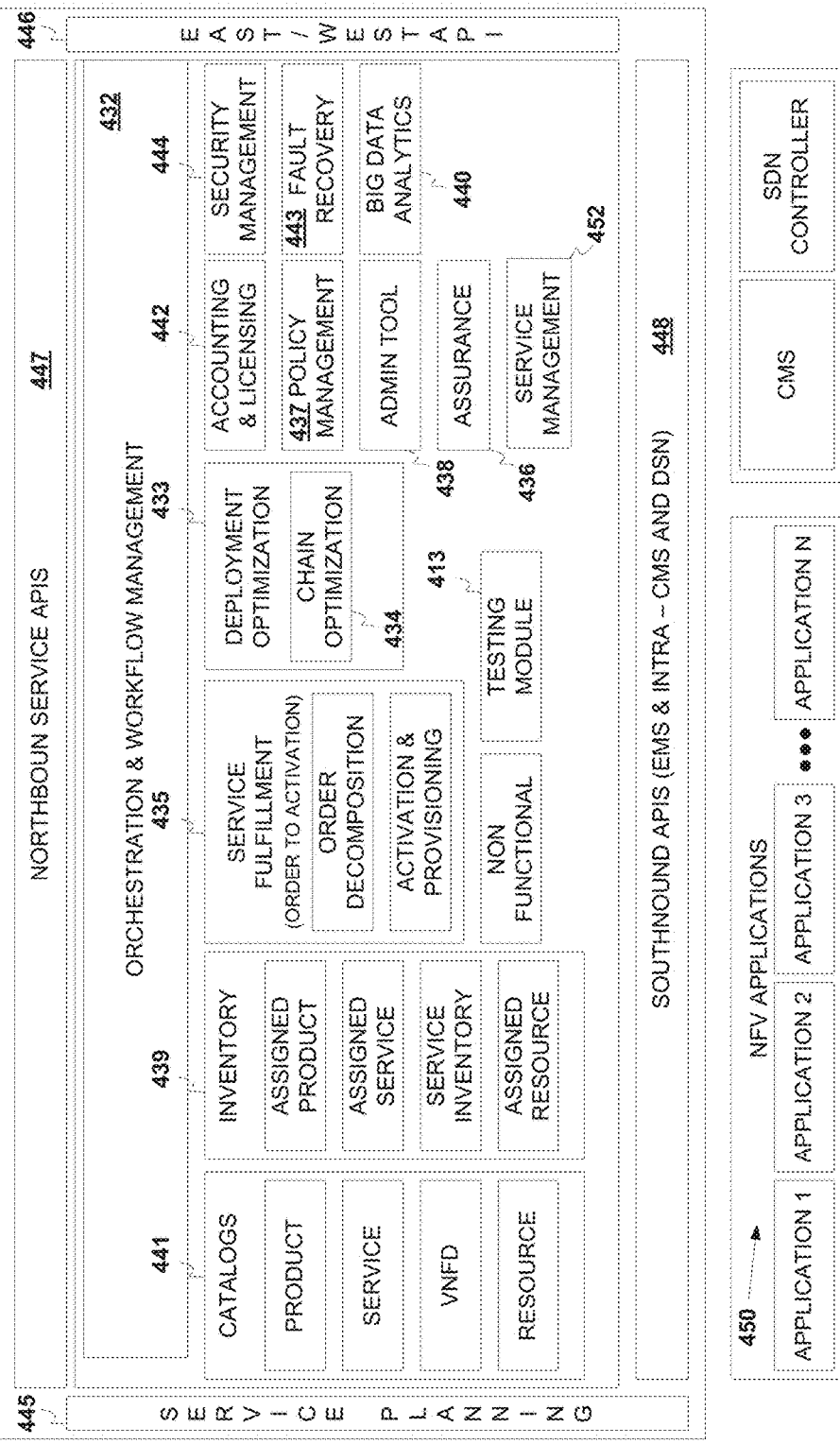
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-module 412, and a testing module 413. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The testing module 413 may also be part of the NFV-O module 412. The testing module 413 may be operable to implement any or all functionality described in the context of FIG. 1, etc.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a testing module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Utilizing the techniques/systems described herein, when a user desires to evaluate a new virtual service, multiple virtual services, or scale up of virtual services, in one embodiment, a virtual copy of the service or the multiple services that the user wants to test may be created. Additionally, other services needed for the copy to be fully functional are duplicated. In some cases, the entire system may be duplicated to validate a single service. Further, the traffic coming in may be duplicated and sent to the copy of the service as well. A comparator may then be used to compare the results of the duplicated virtual system to the system under test. Optionally, coverage may be used to evaluate quality of testing. As another option, coverage and sampling may be used to reduce the cost of testing.

This approach is invisible to the system under test. It may continue to run at the same pace, getting the same result so it is possible to implement in the field. Further, no tests are needed, and there are no expected results.

Testing a single service (e.g. which may be the most common scenario) will work well if a suitable comparator exists after the service. If not, multiple services (that are not being tested themselves) may be copied in order to test a particular service.

More information regarding copying services for testing virtual services may be found in U.S. Provisional Patent Application No. 62/034,715, titled "SYSTEM, METHOD, AND COMPUTER PROGRAM FOR TESTING VIRTUAL SERVICES," which is incorporated herein by reference in its entirety.

FIGS. 6A-6D illustrate examples 600-630, in accordance with various embodiments. As an option, the examples may be implemented in the context of the details of the previous Figures. Of course, however, the examples may be implemented in the context of any desired environment. Further, the aforementioned definitions may equally apply to the description below.

Figure 6A:
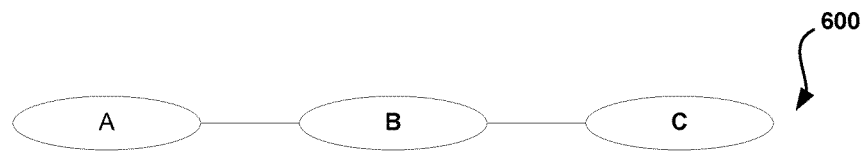
FIGS. 6A-6D illustrate examples, in accordance with various embodiments.
Figure 6B:
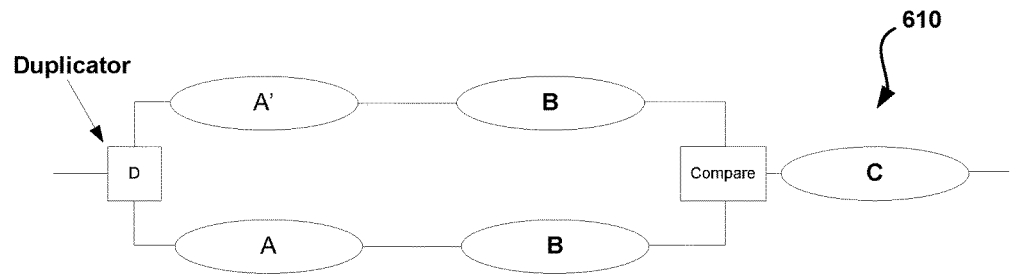
Figure 6C:
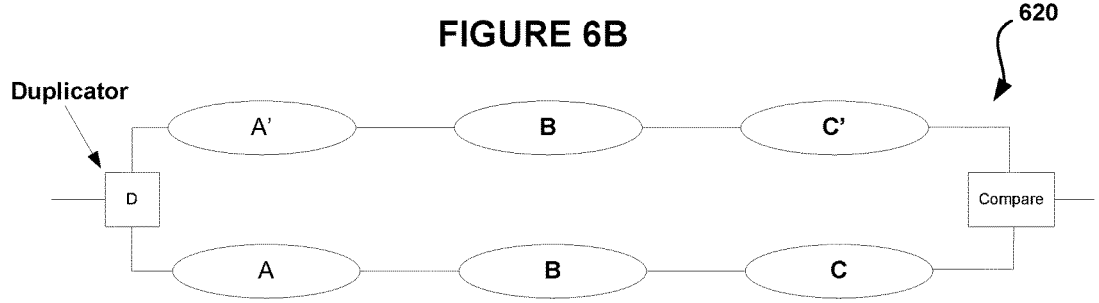

As an example implementation, a user may desire to test virtual service A' as replacement for virtual service A, shown in FIG. 6A. However, A' and A are not exactly the same in functionality, and a smart comparator may exist only after B, in which case B needs to be duplicated, as well. An example of a resulting testing graph is shown in FIG. 6B.

However, if B is a physical service that cannot be duplicated, then this approach does not work. Also, if B is a physical service not used to full capacity, there may not be a reason to duplicate it and pay for the testing when B could have been used. Even if B is a virtual service and duplication is possible, a user may not want to pay for an additional instance.

On the other hand, there may be multiple services and a user may want to test how they work in conjunction. For example, if a user plans to add A' and C' then the testing system may look the example shown in FIG. 6C.

In this example, the reason B needs to be copied even though that virtual service is not being tested is to test how A' and C' work in conjunction. Therefore, it is desirable to see how a subsystem containing A' and C' is working compared to one that has A and C.

However, B may be a physical service that cannot be duplicated, or the cost for duplicating B may be too much. In this case, a system as depicted in FIG. 2D may be utilized.

In this case, B is used both for the testing and for the real/original system. Additionally, in this case, traffic may be tagged as testing traffic or regular traffic. In one embodiment, tagging can be done by VLAN tagging 802.1Q or IP Tunneling (e.g. as in GRE, etc.). In one embodiment, the traffic may be tagged as test, real, or ignore (e.g. using two bits, etc.). As another option, the traffic may be tagged as test or ignore utilizing one bit. In another embodiment, more bits may be assigned to the tag to indicate to which test the data belongs, as there may be multiple tests running in parallel.

Figure 6D:
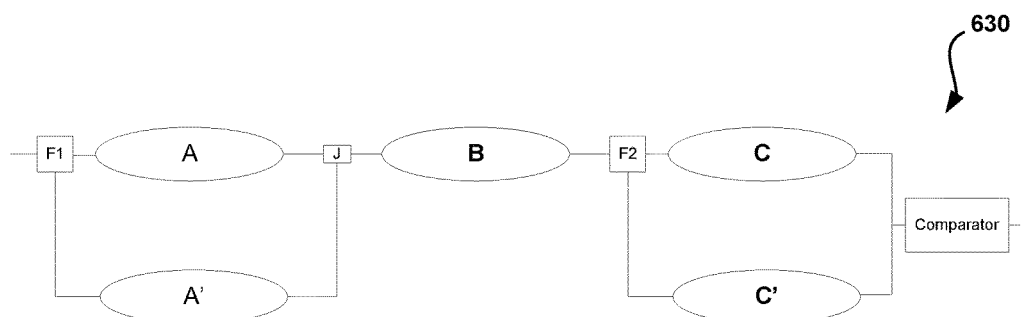

As shown in FIG. 6D, a forking element (elements F1 and F2) may be added as part of the system. A forking element is a new type of virtual network function which functions to channel testing traffic to the testing copy (or the correct testing copy), and regular traffic to the normal location. The forking element may receive a packet, consult the rules that it has, and according to the tag decide where to send the packet. The forking element may, according to the tag, make multiple copies to send to different places and may create or change the tag on some of the packets.

Utilizing a technique as depicted in FIG. 6D may be feasible if no virtual copy of B exists. Additionally, the technique may be utilized if the virtual service of B exists but with slightly different functionality that adds to a complexity of testing. For example, if a user plans on buying virtual A and C but not B the user may not like to add B' testing to the process. Further, such technique may be cheaper because the technique uses an existing capacity and does not require an additional instance.

If B is stateless, then this solution of FIG. 6D works well. If B has a state, there may be some issues in some cases. The issues may be that running the traffic multiple times through B (test and real) may impact B and change the results, which is undesirable. However, such tagging solution may be utilized in a variety of these cases.

As an example, the state of B may impact the packet but have no real impact on the computation. For example, B may record the number of packets and write it in the traffic, or add a time stamp, etc. In this case, using a smart comparator that knows to ignore or take into account the impact of the testing can be used.

As another example, the state of B may be impacted by the last few (n) packets. In this case, the collector before B (J) may collect from A and A' and send to B in groups. Then, it may add previous packets from the relevant side. This means that the collector in this case is a new type of virtual network function. The collector may add a new tag ignore which means that the result of B on that packet may be ignored (e.g. removed at the other and by the forking element).

For example, it may be assumed that B is impacted by the last two packets and 10 bits of traffic are sent, and the bits are collected in groups of 5. For this example, it may be assumed the packet is 1000-1010. Thus, the collector after A and A' sees 1000r (1000 of real system), 1000t (1000 of test system), 1001r, 1002r, 1001t . . . . 1010r.

Once it collects 1000r to 1005r it passes through to B 998ri (i tag ignore, r tag real from memory) 999i and then 1000r through 1005r. This way they will be with the right context. The same may be done for those that passed through the testing system. The aggregator may be smart in this case and enhanced to perform this functionally supported by the tags.

As another example, B may have a state but there may be a way to take a snapshot of B and to start it from that snapshot. In this case, instead of sending a few packets again, the last snapshot may be uploaded. This requires that the service has snapshot mechanism and may be more expensive.

In the last two examples above, the more aggregation of messages the less the cost of correcting for the state (done less times for each stream), so optimizing by comparing cost of aggregation to correction (taking a snapshot, for example) may be done in advance and the number of packets to be aggregated may be decided this way.

If there are multiple chained services, assuming in the example above that A and E are tested and between them B, C, and D are used for both test and real time, then the size of the aggregation will depend on B, C, and D.

In various embodiments, there may be multiple tests running in parallel. For example, A' and C' may each be tested independently and a comparator may exist only after C as in FIG. 6D.

Preferably, every packet going through A, B, C will be compared to going through A' B C and to A B C' (e.g. and possibly also to A' B C'). Thus, in this case, it may be desirable to run two different tests in parallel. The test A' B C may be marked as T1, A B C' as T2, and the regular as R.

When F1 receives a packet, F1 may function to send one copy to A and mark it with R and another copy to A' and mark it with T1.

When F2 receives a packet, if the packet is marked with T1, F2 moves the packet to C. If the packet is marked with R, F2 moves the packet to C and makes a copy, marks it with T2 and sends it to C'.

The comparator compares packets marked with R to those marked with T1 and T2. If a user wanted to have another test running in parallel of A' B C', F2 may be changed to function such that if the packet is marked with T1, F2 moves the packet to C, makes a copy, marks it with T3 and sends it to C'. If the packet is marked with R, F2 moves the packet to C and makes a copy, marks it with T2, and sends it to C'.

In this case, the comparator can consult tags to decide what data to compare. For example, in the above example, there are four tags, R, T1, T2, and T3 for each packet. When compared, a difference may be found and information may be reported on packet P T1 and T3 mismatch, for example.

In some cases, tagging may impact the running time of the real system that is being used. In these cases, if an impact is noticeable, sampling and coverage based sampling may be utilized to reduce the overhead.

Figure 7:
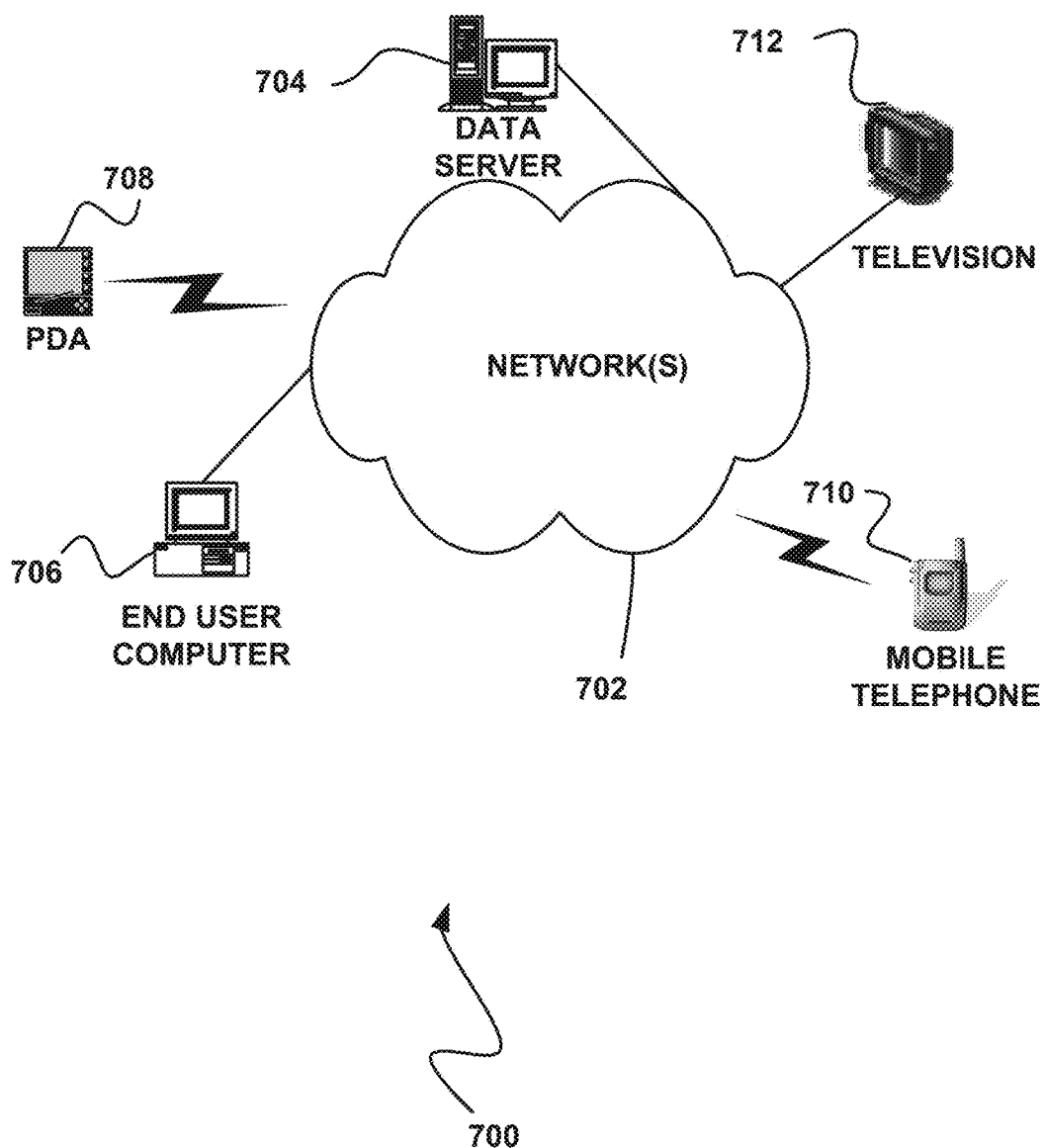
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
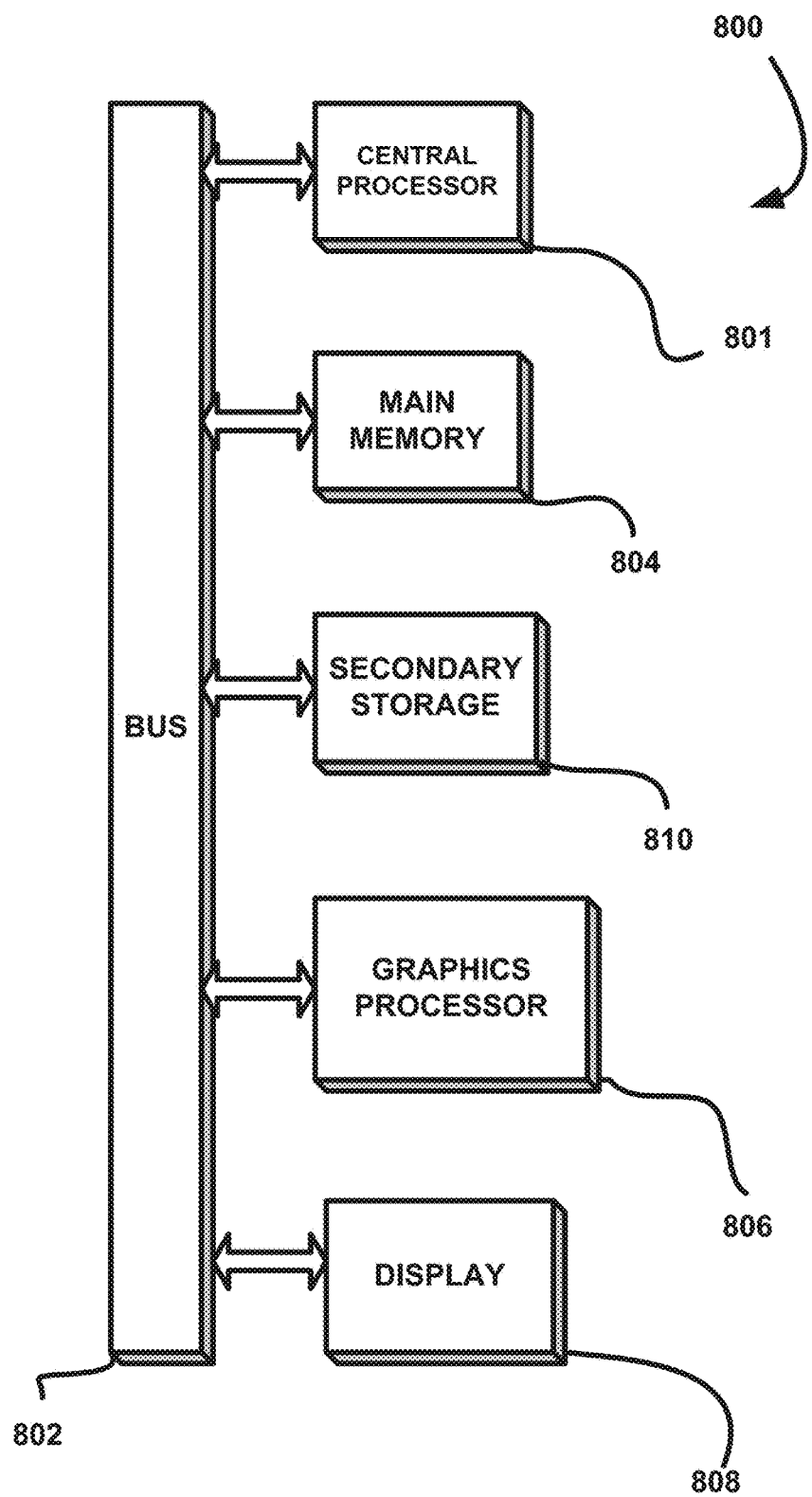
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying at least an original portion of a system within a network in which to implement a modification, the original portion of the system including a first virtual service that sends packets to a second virtual service through a third virtual service, and the modification being an update to the first virtual service and the second virtual service;
determining that a smart comparator exists within the original portion of the system following the second virtual service;
duplicating the original portion of the system to create a duplicate portion of the system having a duplicate first virtual service that sends packets to a duplicate second virtual service through a duplicate third virtual service;
implementing the duplicate portion of the system within the network;
forming an updated portion of the system by implementing the modification including applying the update to the duplicate first virtual service and the duplicate second virtual service;
testing the updated portion of the system including how the duplicate first virtual service and the duplicate second virtual service included in the updated portion of the system work in conjunction with one another by:
receiving input data associated with the updated portion of the system,
duplicating the input data to generate a first input data and a second input data,
tagging the first input data as testing data,
tagging the second input data as regular data,
processing the first input data with the updated portion of the system, including processing the first input data through the duplicate first virtual service, the duplicate third virtual service, and the duplicate second virtual service to generate first output,
processing the second input data with the original portion of the system, including processing the second input data through the first virtual service, the third virtual service, and the second virtual service to generate second output,
using the smart comparator for comparing at least a portion of the first output from the updated portion of the system with at least a portion of the second output from the original portion of the system.

2. The method of claim 1, wherein the first input data is tagged with at least one bit indicating the first input data is testing data and the second input data is tagged with at least one bit indicating the second input data is regular data.

3. The method of claim 1, wherein the first input data is tagged with a plurality of bits indicating the first input data is testing data and indicating a test with which the first input data is associated.

4. The method of claim 1, wherein the smart comparator includes one or more semantic comparators or one or more database comparators.

5. The method of claim 1, wherein comparing the at least a portion of the first output from the updated portion of the system with the at least a portion of the second output from the original portion of the system includes an exact comparison.

6. The method of claim 1, wherein comparing the at least a portion of the first output from the updated portion of the system with the at least a portion of the second output from the original portion of the system includes a partial comparison.

7. The method of claim 1, further comprising utilizing coverage to evaluate a quality of testing.

8. The method of claim 1, further comprising utilizing coverage and sampling to test a subset of traffic.

9. The method of claim 1, wherein the system includes a Network Function Virtualization based (NFV-based) system.

10. The method of claim 1, wherein the system includes a hybrid physical and NFV-based system.

11. A computer program product embodied on a non-transitory computer readable medium, comprising:
    computer code for identifying at least an original portion of a system within a network in which to implement a modification, the original portion of the system including a first virtual service that sends packets to a second virtual service through a third virtual service, and the modification being an update to the first virtual service and the second virtual service;
    determining that a smart comparator only-exists within the original portion of the system following the second virtual service;
    computer code for duplicating the original portion of the system to create a duplicate portion of the system having a duplicate first virtual service that sends packets to a duplicate second virtual service through a duplicate third virtual service;
    computer code for implementing the duplicate portion of the system within the network;
    computer code for forming an updated portion of the system by implementing the modification including applying the update to the duplicate first virtual service and the duplicate second virtual service;
    computer code for testing the updated portion of the system including how the duplicate first virtual service and the duplicate second virtual service included in the updated portion of the system work in conjunction with one another by:
        receiving input data associated with the updated portion of the system,
        duplicating the input data to generate a first input data and a second input data,
        tagging the first input data as testing data,
        tagging the second input data as regular data,
        processing the first input data with the updated portion of the system, including processing the first input data through the duplicate first virtual service, the duplicate third virtual service, and the duplicate second virtual service to generate first output,
        processing the second input data with the original portion of the system, including processing the second input data through the first virtual service, the third virtual service, and the second virtual service to generate second output,
        using the smart comparator for comparing at least a portion of the first output from the updated portion of the system with at least a portion of the second output from the original portion of the system.

12. A system comprising:
    a memory system; and
    one or more processing cores coupled to the memory system and that are each configured to:
    identify at least an original portion of a subsystem within a network in which to implement a modification, the original portion of the system including a first virtual service that sends packets to a second virtual service through a third virtual service, and the modification being an update to the first virtual service and the second virtual service;
    determining that a smart comparator exists within the original portion of the system following the second virtual service;
    duplicate the original portion of the system to create a duplicate portion of the system having a duplicate first virtual service that sends packets to a duplicate second virtual service through a duplicate third virtual service;
    implement the duplicate portion of the system within the network;
    form an updated portion of the system by implementing the modification including applying the update to the duplicate first virtual service and the duplicate second virtual service;
    test the updated portion of the subsystem including how the duplicate first virtual service and the duplicate second virtual service included in the updated portion of the system work in conjunction with one another by:
        receiving input data associated with the updated portion of the subsystem,
        duplicating the input data to generate a first input data and a second input data,
        tagging the first input data as testing data,
        tagging the second input data as regular data,
        processing the first input data with the updated portion of the subsystem, including processing the first input data through the duplicate first virtual service, the duplicate third virtual service, and the duplicate second virtual service to generate first output,
        processing the second input data with the original portion of the system, including processing the second input data through the first virtual service, the third virtual service, and the second virtual service to generate second output,
        using the smart comparator for comparing at least a portion of the first output from the updated portion of the subsystem with at least a portion of the second output from the original portion of the subsystem.

* * * * *